(12) United States Patent
Mahlanen et al.

(10) Patent No.: US 7,096,829 B2
(45) Date of Patent: Aug. 29, 2006

(54) SPRAYING HEAD

(75) Inventors: Timo Mahlanen, Helsinki (FI); Jan Rönnberg, Kirkkonummi (FI); Aimo Honkanen, Vantaa (FI); Göran Sundholm, Tuusula (FI); Harry Metzger, Kerava (FI); Maarit Tuomisaari, Espoo (FI)

(73) Assignee: Marioff Corporation OY, Vantaa (FI)

( * ) Notice: Subject to any disclaimer, the term of this patent is extended or adjusted under 35 U.S.C. 154(b) by 0 days.

(21) Appl. No.: 10/511,939

(22) PCT Filed: Apr. 16, 2003

(86) PCT No.: PCT/FI03/00301

§ 371 (c)(1),
(2), (4) Date: May 19, 2005

(87) PCT Pub. No.: WO03/089775

PCT Pub. Date: Oct. 30, 2003

(65) Prior Publication Data

US 2005/0199190 A1    Sep. 15, 2005

(30) Foreign Application Priority Data

Apr. 19, 2002    (FI) .................................. 20020752

(51) Int. Cl.
*F02B 47/02*    (2006.01)
*B05B 1/14*    (2006.01)
(52) U.S. Cl. ........................... 123/25 R; 239/553.5
(58) Field of Classification Search ... 123/25 R–25 Q; 239/291, 292, 553.5, 549
See application file for complete search history.

(56) References Cited

U.S. PATENT DOCUMENTS

| | | | |
|---|---|---|---|
| 3,911,871 A | 10/1975 | Williams et al. | |
| 4,051,815 A | 10/1977 | Coberley | |
| 4,406,255 A | 9/1983 | Goodman | |
| 4,459,943 A * | 7/1984 | Goodman | 123/25 J |
| 4,757,787 A | 7/1988 | Risitano et al. | |
| 5,590,836 A * | 1/1997 | Thielbar | 239/391 |
| 5,758,618 A * | 6/1998 | Jay et al. | 123/25 C |
| 6,042,027 A * | 3/2000 | Sandvik | 239/422 |
| 2003/0000773 A1 | 1/2003 | Engler et al. | |

FOREIGN PATENT DOCUMENTS

JP        08-338317        12/1996

* cited by examiner

*Primary Examiner*—Noah P. Kamen
(74) *Attorney, Agent, or Firm*—Ladas & Parry LLP

(57)                ABSTRACT

A spraying head for the humidification of intake air of a piston engine has a body and channels for supplying a spraying medium from an inlet to nozzles. A shutting/regulating mechanism respectively shuts off/regulates the channels.

12 Claims, 4 Drawing Sheets

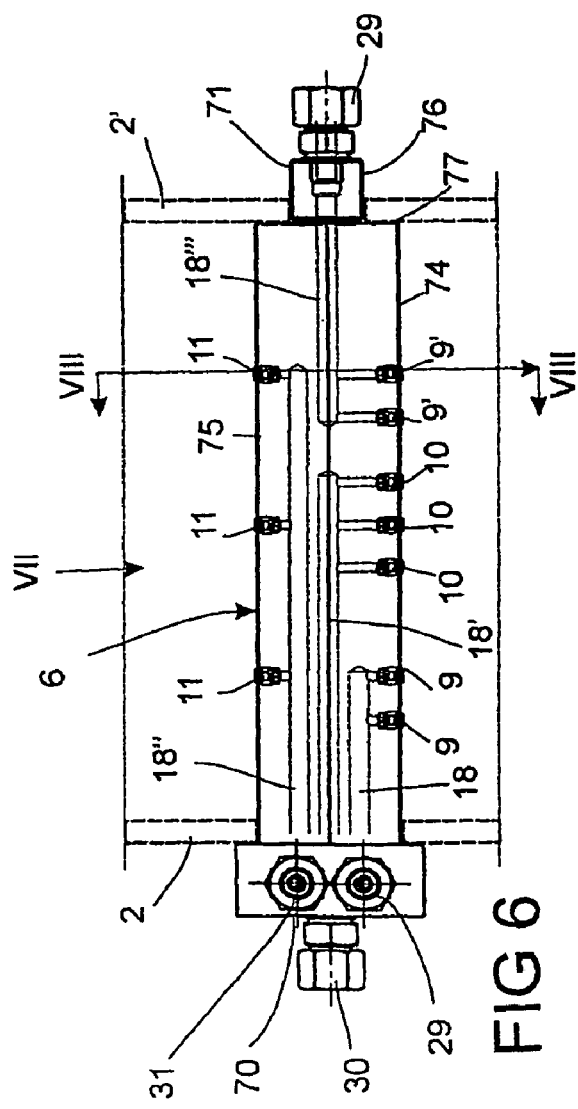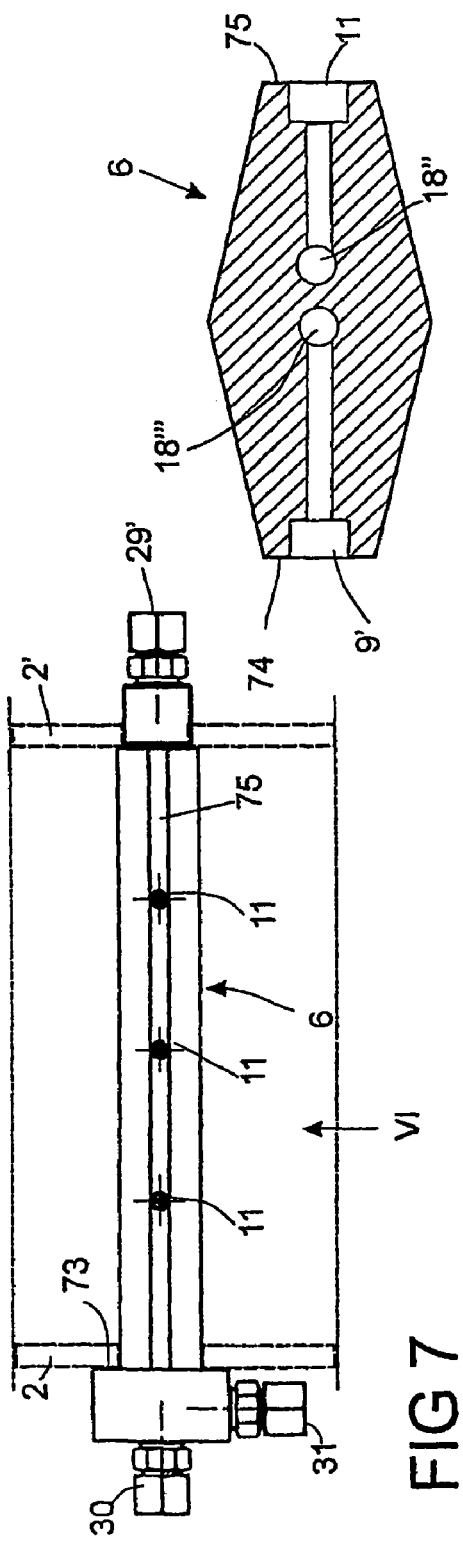

SPRAYING HEAD

BACKGROUND OF THE INVENTION

The present invention relates to a spraying head as defined in the preamble of claim 1, especially for the humidification of the intake air of a piston engine, said spraying head comprising a body and a channel for the supply of a spraying medium from an inlet to at least one nozzle.

The exhaust gases of piston engines, in particular diesel engines, contain many kinds of noxious combustion products. At the high combustion temperatures, the combustion process in the cylinders of a piston engine produces nitrogen oxides (NOx), which are emitted together with the exhaust gases into the atmosphere. Because of the harmful environmental effects of nitrogen oxide emissions, efforts are undertaken to minimize their production.

As is known, adding water to the combustion process reduces the generation of nitrogen oxides. This phenomenon is based on the cooling effect of water. In practice, the introduction of water into the combustion process is often implemented by injecting water into the intake air. These arrangements are advantageous in respect of efficiency of the engine. The maximum amount of water introduced into the combustion space of the engine may be that amount which will remain in gaseous form in the intake air pressure and temperature conditions.

The object of the invention is to achieve a completely new type of spraying head that allows the intake air to be humidified in a desired manner in different engine load conditions.

Spraying head of the invention is characterized in that the spraying head is provided with at least two channels, each one which forms a separate passage to at least one nozzle.

The spraying head of the invention is additionally characterized by what is stated in claims 2–10.

The solution of the invention has numerous significant advantages. By forming several liquid feed channels in the spraying head, it will be easy to control the amount and/or quality of water to be supplied through the spraying head. By providing the spraying head with nozzles having different properties, the characteristics of the water mist to be injected can be varied in a desired manner by opening and closing the medium channels leading to different nozzles in the spraying head. Installing the spraying head as a complete module is easy as compared with mounting several separate nozzles. In addition, the aiming direction of the nozzles of the spraying head and the distances between them can be easily adjusted to the designed settings. Moreover, the spraying head can be securely mounted in the air intake duct. Using the spraying head of the invention, diverse adjustment possibilities and, when necessary, a good water distribution through the air intake duct are achieved.

BRIEF DESCRIPTION OF THE DRAWINGS

In the following, the invention will be described in detail by the aid of an example with reference to the attached drawing, wherein FIG. 6 presents another embodiment of the spraying head of the invention, FIG. 7 presents the spraying head of the invention as seen from direction VII in FIG. 6, and FIG. 8 presents a section through the spraying head in FIG. 6, taken along line VIII—VIII.

DETAILED DESCRIPTION OF THE INVENTION

Figure 1:
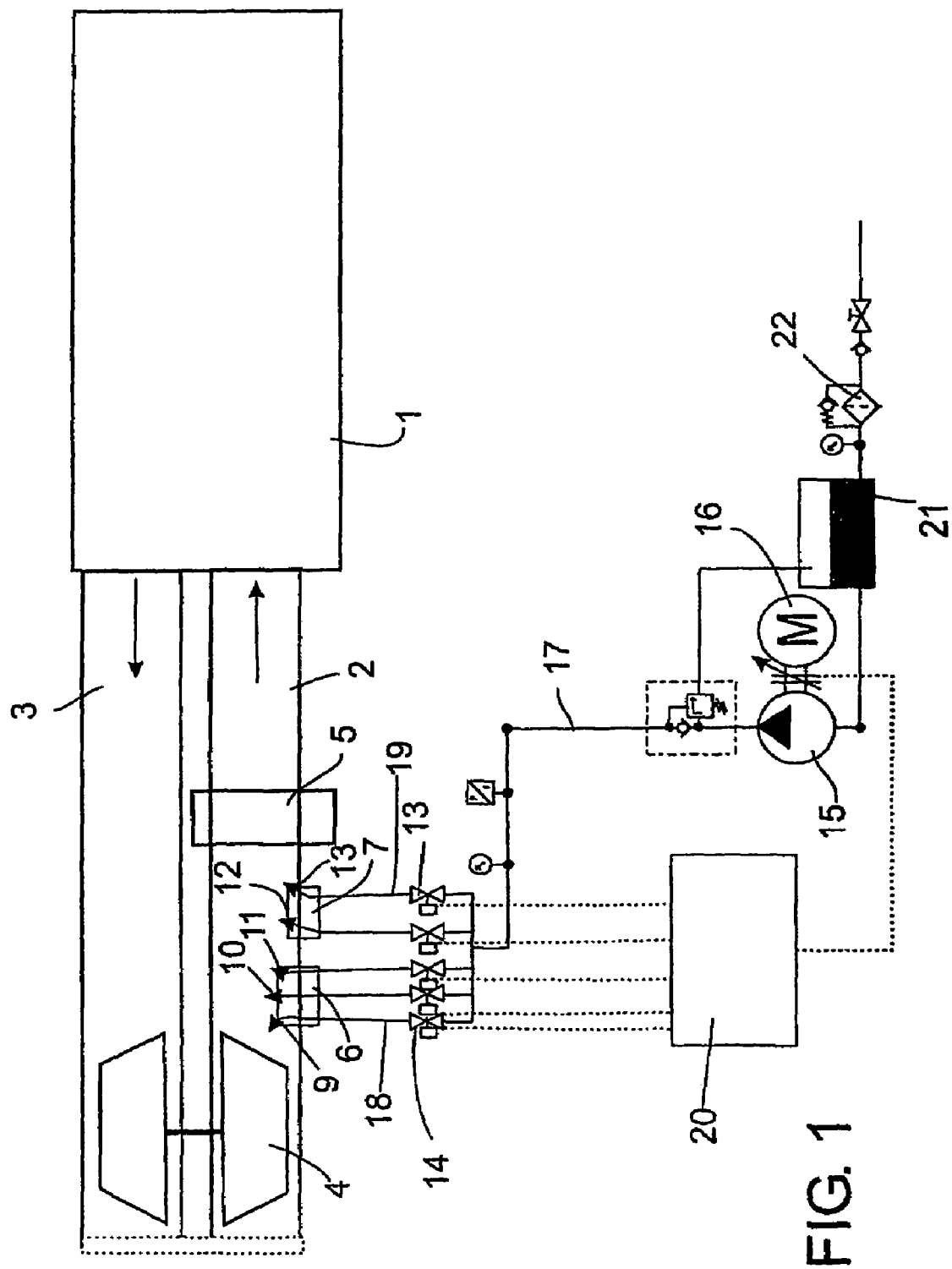
FIG. 1 presents an apparatus employing a spraying head according to the invention.

FIG. 1 presents a diagrammatic representation of an apparatus employing the spraying head of the invention, installed in connection with the air intake duct 2 of a piston engine, such as a diesel engine. In the figure, the air intake duct 2 and the exhaust duct 3 are shown in a simplified form. The engine presented in the figure is provided with a supercharger 4, which feeds air under positive pressure into the intake ductwork 2 of the engine. To reduce the nitrogen oxide emissions of the engine, the air intake ductwork is provided with at least one spraying head 6, 7, fitted to feed water mist into the intake ductwork 2. In the case illustrated in the figure, the intake ductwork is also provided with a heat exchanger element 5, such as a charge-air intercooler. In this figure, two spraying heads 6, 7 are used.

At least one spraying head 6, 7 in the spraying apparatus is connected directly to the structures 4 of the air intake duct 2 and a fine mist produced by the spraying head 6, 7 comprising at least one nozzle is injected directly into the intake air in the air intake duct. When the solution of the invention is used, no extra chambers or other containers are needed in the air intake ductwork. The nozzles feed water mist under a high pressure into the air intake duct. The water is in the form of a fine mist. Preferably 90% of the water volume (Dv90) is in the form of droplets having a size typically below 200 micrometers, preferably below 100 micrometers and more preferably below 50 micrometers. In a typical case according to the invention, the pressure in the supply pipe is typically at least 10 bar, preferably at least 30 bar, most preferably over 50 bar. The pressure range is typically 10–300 bar.

The apparatus comprises means for delivering an aqueous liquid to the nozzles. In the embodiment presented in FIG. 1, the apparatus comprises a liquid source 21, from where the liquid is pumped through a pipe 17 by means of a pump 25. The pump is operated by a drive 16. The liquid can be directed via channels 18, 19 to different nozzles 6, 7. The apparatus comprises a system required for the regulation of the amount of water sprayed, by means of which system the amount of water to be evaporated into the intake air and the cooling of the intake air can be controlled. The apparatus comprises a shutting/regulating mechanism as valve elements 13, 14 arranged in connection with the liquid flow passages, such as pipes 18, 19 leading to the nozzles of the spraying head. The valves 13, 14 are typically controlled by a control system 20. Thus, the liquid flow passages 18, 19 can be opened and closed as necessary.

Figure 3:
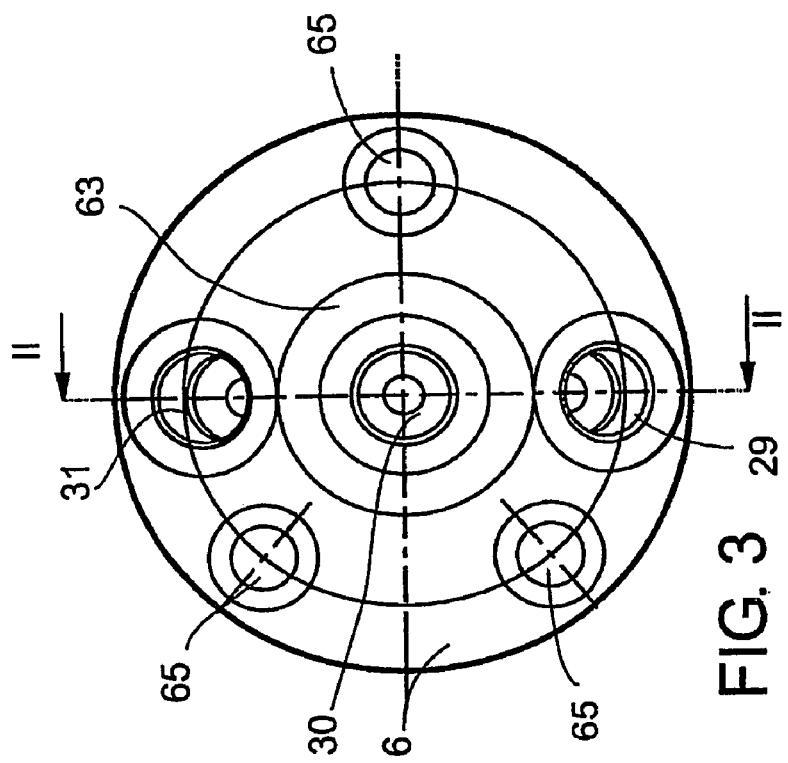
FIG. 3 presents a spraying head according to the invention.
Figure 2:
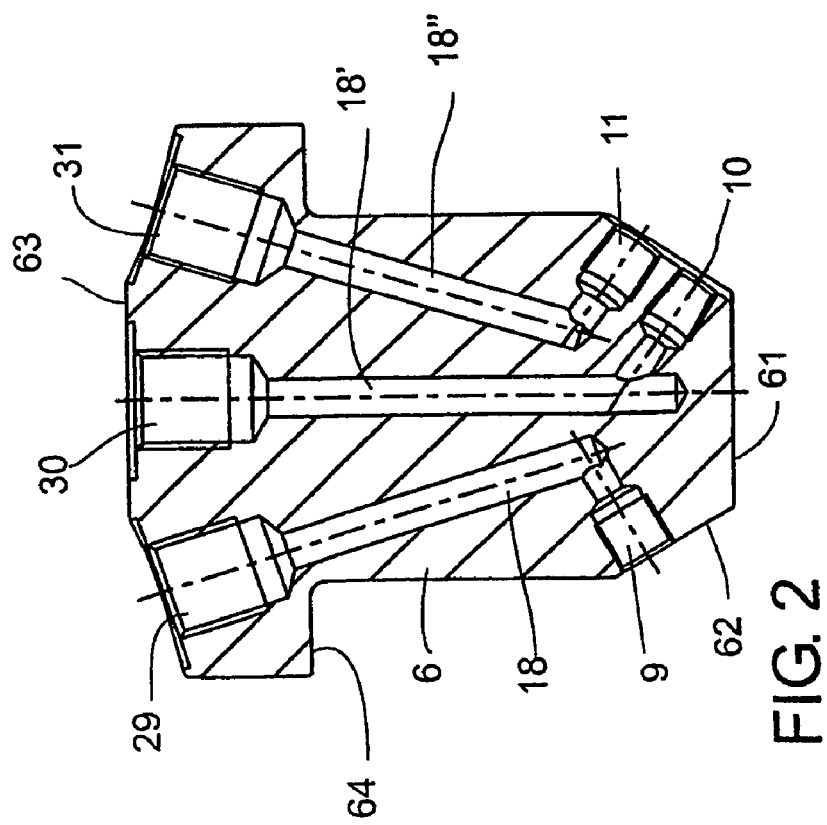
FIG. 2 presents a spraying head according to the invention, sectioned along line II—II in FIG. 3.

A spraying head 6 according to the invention is presented in FIGS. 2 and 3. The spraying head comprises a body in which is formed at least one channel 18, 18', 18" for conveying a pressure medium to the nozzles 9, 10, 11. In the spraying head presented in the figure, a separate channel 18, 18', 18" is provided for each nozzle 9, 10, 11. This allows individual control of the flow and/or pressure of the pressure medium supplied to each nozzle 9, 10, 11.

According to another embodiment, the nozzles of the spraying head can be arranged in groups so that each feed channel communicates with several nozzles.

Figure 5:
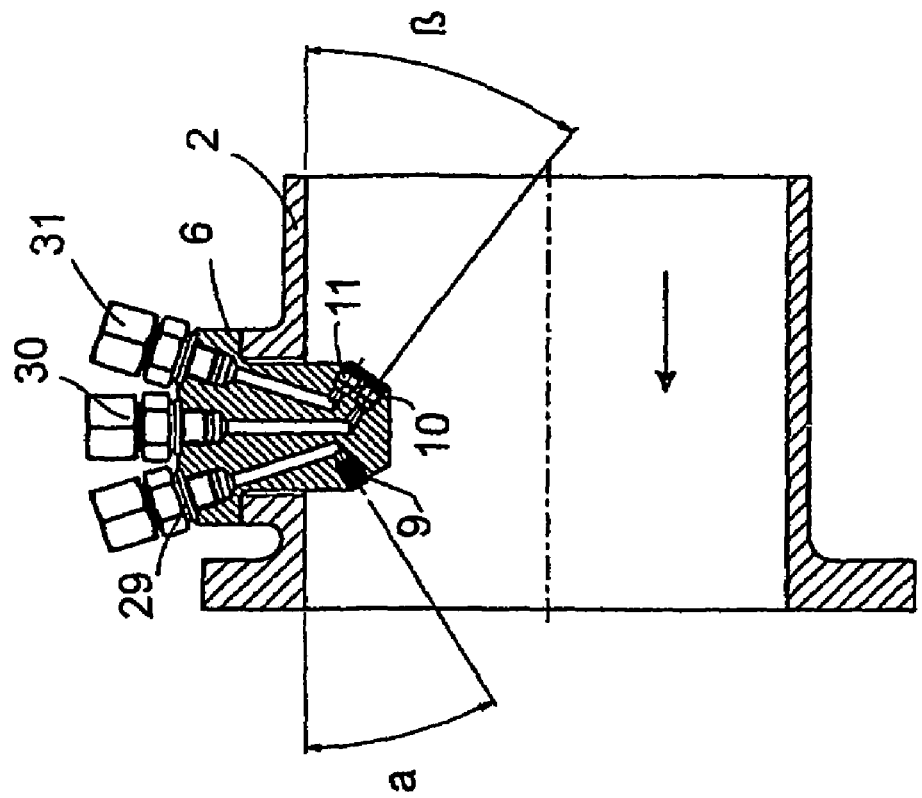
FIG. 5 presents an embodiment of the invention sectioned along line V—V in FIG. 4.
Figure 4:
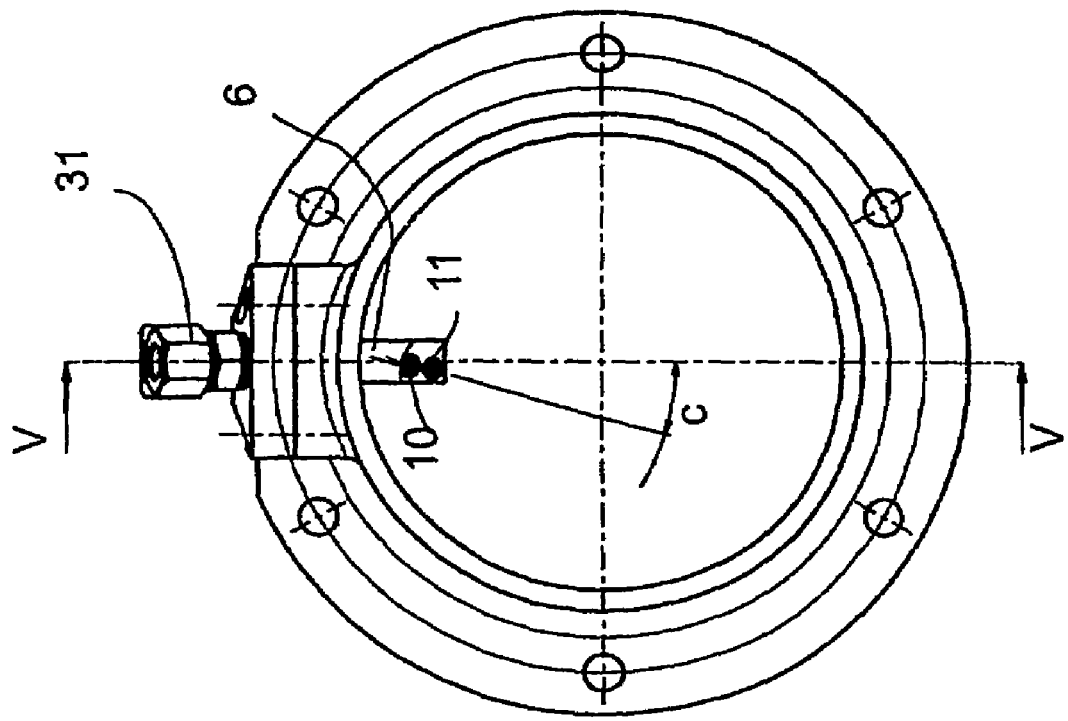
FIG. 4 presents a spraying head according to the invention installed.

The nozzles 9, 10, 11 in the spraying head 6 may have different properties, which have been adapted according to the placement of each nozzle. The form of the spraying head, the number of nozzles and their aiming direction may vary depending on the application. Typically, at least that part of the spraying head which extends inside the space defined by the air intake duct walls 2 has been made narrower in the direction of the intake air flow than in a direction perpendicular to the direction of intake air flow. FIGS. 4 and 5 illustrate a spraying head of the invention mounted in an air intake duct 2. The direction of intake air flow is indicated by an arrow in FIG. 4. Placed on the intake air entry side, the spraying head has two nozzles 10, 11 and one nozzle 9 on the exit side. The nozzles on the entry side are aimed in a direction substantially against the flow of the intake air. They may also differ by an angle $\beta$ from the flow direction. The nozzle spraying substantially in the flow direction may differ from the intake air flow direction by an angle $\alpha$. The nozzles may be aimed in a direction deviating from at least one vertical plane by an angle c. The angles depend on the embodiment, such as the intake air flow rate and shape of the intake ductwork, so their direction and magnitude may vary considerably from case to case. Angles $\alpha$ and $\beta$ may vary between 0–90°. Angle c may vary between 0–±90°.

It is also possible supply different mediums, such as water and gas, to the nozzle. The nozzles are not shown in detail in the figure, but they may be replaceable depending on the application.

The nozzles are therefore of a type such that they produce a spray of fine mist when supplied with liquid under a high pressure. Many kinds of nozzles of this category are known, e.g. from fire extinguishing technology employing water mist. For example, specifications WO 92/20454 and WO 94/06567 disclose nozzles that produce a water mist at a high pressure. Naturally, other types of nozzles may also be used, e.g. specification WO 01/45799 discloses yet another nozzle.

The amount of water supplied through the nozzles typically increases with increasing engine load. Thus, when the engine load is low, it is possible to supply water only to some of the nozzles and increase the number of nozzles spraying when the load increases. Similarly, the spraying head can be provided with nozzles having different properties, such as nozzle aperture size, droplet size produced by the nozzle, etc. It is thus possible to form different combinations which can be adapted to a wide range of different applications, different engine types, different placements and conditions.

FIGS. 6–8 present another embodiment of the spraying head 6 of the invention. The spraying head is arranged to extend substantially across the air intake duct between the opposite walls 2–2' of the duct. The body of the spraying, head preferably has the shape of a wing-like object. Formed in the body are channels 18, 18', 18" for supplying a to the nozzles 9, 9', 10, 11 a medium to be sprayed. In the embodiment illustrated in the figure, three inlets 29, 30, 31 into the feed channels are provided at the first end 70 of the spraying head. One inlet 29 is provided at the opposite end 71 of the spraying head. The nozzles are arranged to spray in desired directions. In the embodiment illustrated, some of the nozzles 9, 10, 9' are arranged to spray in the air intake duct against the direction of air entry while some of the nozzles 11 are arranged to spray in the direction of air flow. Nozzles 9, 9' and 10 are therefore placed at the edge 74 of the spraying head body facing against the air entry direction while nozzles 11 are placed at the air exit-side edge 75 of the body. Formed in the body of the spraying head are three channels 18, 18', 18" coming from the first end of the spraying head and one channel 18'" from the second end of the spraying head. With the spraying head of the invention, the spraying of the pressure medium to be sprayed can thus be distributed over the width of the air intake duct at least in the area of the spraying head. In addition, by directing the supply of pressure medium to different channels 18, 18', 18", 18'", it is possible to influence the operation of the spraying head feeding the air intake duct in respect of e.g. the direction of injection or the point of injection. For example, the spraying can be implemented by initially spraying by the nozzles 10 in the middle, next by also spraying by the nozzles 9, 9' in the edge part, either from one edge or both edges, and finally by spraying by the nozzles 11 at the exit-side edge as well.

Provided at the first end of the spraying head is a mating surface 73 which is pressed against the wall 2 of the air intake duct either directly or via an intermediate piece. Formed or arranged at the opposite end 71 of the spraying head is a supporting element extending to the opposite side of the opposite wall 2'. The supporting element typically is provided with threads allowing the spraying head to mounted and tightened on the air intake duct by means of a fastening element, such as a nut. The spraying head according to this second embodiment is typically mounted in an opening formed in the wall 2 of the air intake duct, said opening having dimensions such that the spraying head parts intended to go inside the air intake duct can be inserted through it. The shape of the opening is typically designed that it also guides the spraying head to the correct position in the air intake duct. Formed in the opposite wall 2' of the air intake duct is a second opening, which is so designed that at least the supporting element 76 can go through it while a second mating surface 77 formed at the other end of the spraying head remains inside the air intake duct. The spraying head is locked on the air intake duct by means of a nut provided on the supporting element 76 so that the other wall 2' remains between the second mating surface and the tightening element (not shown). This arrangement allows the spraying head to be easily and securely mounted on the air intake duct.

FIG. 8 presents a cross-sectional form of the spraying head presented in FIG. 6. That part of the spraying head which is to go inside the air intake duct is preferably formed as a wing-shaped part. In its cross-sectional form, it has a thicker portion at the middle, becoming thinner towards the edges 74, 75. In the case presented in the figure, the cross-sectional form is symmetrical, but it need not necessarily be symmetrical. The cross-sectional form can be adapted according to the application.

An apparatus employing the spraying head of the invention can fully utilize the quantity of heat required for the vaporization of water, cooling the intake air at each injection point to a temperature close to the wet bulb temperature (or adiabatic saturation temperature, which in the case of a water-air mixture is practically the same thing), i.e. to the temperature to which the temperature of air can be reduced by vaporization of water.

In the apparatus of the invention, the humidity of the intake air is preferably increased stepwise after each heat supply point. However, relative to the direction the intake air flow, water mist is injected before the last heat supply point, which can be used as a water evaporation surface.

By this arrangement, the humidity of the gas fed into the cylinder and therefore the formation of nitrogen oxides is regulated within the desired limits.

It is obvious to the person skilled in the art that the invention is not limited to the example described above, but that it may be varied within the scope of the claims presented below. Thus, the spraying head may comprise two, three, four or more nozzles. The spraying head has at least two channels.

The invention claimed is:

1. In a spraying head for the humidification of intake air of a piston engine, said spraying head comprising a body and channels for supplying a spraying medium from an inlet to nozzles, the improvements characterized in that the spraying head (6) is provided with respective channels (18,18',18") to the nozzles (9,10,11), and a shutting/regulating mechanism is provided in connection with the spraying head (6) to allow the supply of the spraying medium to the channels (18,18', 18") to be respectively shut off/regulated, the spraying head being used in the humidification of the intake air of the piston engine.

2. In a spraying head according to claim 1, characterized in that at least some of the nozzles (9,10, 11) of the spraying head are different from each other.

3. In a spraying head according to claim 1, characterized in that the nozzles (9,10,11) have been adapted for spraying a liquid mist.

4. In a spraying head according to claim 1, characterized in that the spraying head has been adapted for spraying a high-pressure liquid mist.

5. In a spraying bead according to claim 1, characterized in that the nozzles (9,10,11) are arranged in groups, and that at least one channel (18,18', 18") leads to each one of said groups.

6. In a spraying head according to claim 1, characterized in that the spraying head comprises at least one nozzle (9) arranged to spray in a direction substantially against the direction of flow of the intake air.

7. In a spraying head according to claim 1, characterized in that at least some of the nozzles (9,10, 11) are arranged to spray in a direction substantially in the same direction.

8. In a spraying head according to claim 1, characterized in that the spraying head comprises at least one nozzle (10,11) arranged to spray substantially in the direction of flow of the intake air.

9. In a spraying head according to claim 1 wherein at least one of the nozzles is arranged to spray in a direction differing from a flow of the intake air.

10. In a spraying head according to claim 1 wherein the spraying head extends substantially across a duct for the intake air.

11. In a spraying head according to claim 1 wherein a body of the spraying head has a shape of a wing-like object.

12. In a spraying head according to claim 1 wherein at least part of the spraying head extends inside an intake duct for the intake air.

* * * * *